| United States Patent [19] | [11] Patent Number: 4,604,447 |
|---|---|
| Malpass, Jr. | [45] Date of Patent: Aug. 5, 1986 |

[54] HALOGEN-FREE, HIGH FLASH POINT REACTANT SOLUTION

[75] Inventor: Gerald D. Malpass, Jr., Wilmington, Del.

[73] Assignee: Hercules Incorporated, Wilmington, Del.

[21] Appl. No.: 554,468

[22] Filed: Nov. 22, 1983

[51] Int. Cl.$^4$ .............................................. C08F 4/52
[52] U.S. Cl. ..................................... 526/189; 526/283
[58] Field of Search ...................... 526/209, 189, 283; 524/378; 525/249

[56] References Cited

U.S. PATENT DOCUMENTS

| 3,917,747 | 11/1975 | Matsumura et al. | 525/249 |
|---|---|---|---|
| 3,960,765 | 6/1976 | Shiga et al. | 526/209 |
| 4,028,481 | 6/1977 | Shiomura et al. | 526/143 |
| 4,076,926 | 2/1978 | Milner et al. | 526/209 |
| 4,366,297 | 12/1982 | Makino et al. | 526/119 |
| 4,400,340 | 8/1983 | Klosiewicz | 524/789 |

*Primary Examiner*—Joseph L. Schofer
*Assistant Examiner*—N. Sarofim
*Attorney, Agent, or Firm*—Dale R. Lovercheck

[57] ABSTRACT

Disclosed is a reactant solution comprised of dicyclopentadiene; trialkyl aluminum, where each alkyl contains from 5 to 10 carbon atoms and where the trialkyl aluminum is present in a dicyclopentadiene to trialkyl aluminum molar ratio of about 80:1 to about 1300:1; and bis(2-methoxyethyl)ether, where the bis(2-methoxyethyl)ether is present in a trialkyl aluminum to bis(2-methoxyethyl)ether ratio of at least 1:0.5. Such a solution, which is both halogen-free and has a flash point greater than 100° F., is useful as a reactant solution in the metathetical-polymerization of the dicyclopentadiene.

22 Claims, No Drawings

HALOGEN-FREE, HIGH FLASH POINT REACTANT SOLUTION

BACKGROUND OF THE INVENTION

This invention relates to the chemical arts. In particular, this invention relates to a reactant solution useful in the metathetical-polymerization of dicyclopentadiene.

U.S. Pat. No. 4,400,340, which patent is herein incorporated for reference, broadly discloses the use of a rate moderated metathesis-catalyst system to make a thermoset poly(dicyclopentadiene). In particular, this patent discloses a method of making thermoset poly(dicyclopentadiene) by combining a plurality of reactant streams, one of which contains dicyclopentadiene, a metathesis-activator and a rate moderator. Consequently, reactant solutions containing the activator and the rate moderator, in dicyclopentadiene, must be prepared. However, reactant solutions that contain the most preferred activators (alkylaluminum halides and dialkylaluminum halides, where the alkyl groups are ethyl) and the preferred rate moderators (isopropyl ether and di-n-butyl ether) are troublesome. Such reactant solutions typically have flash points less than 100° F. and, therefore, special precautions must be taken. Furthermore, such reactant solutions are corrosive and can adversely affect storage tanks and the molding equipment.

In accordance with my invention a halogen-free, high flash point reactant solution is provided by combining dicyclopentadiene, trialkyl aluminum and bis(2-methoxyethyl)ether.

BRIEF DESCRIPTION OF THE PREFERRED EMBODIMENTS

A reactant solution is comprised of dicyclopentadiene; trialkyl aluminum, where each alkyl contains from 5 to 10 carbon atoms and where the trialkyl aluminum is present in a dicyclopentadiene to trialkyl aluminum molar ratio of about 80:1 to about 1300:1; and bis(2-methoxyethyl)ether, where the bis(2-methoxyethyl)ether is present in a trialkyl aluminum to bis(2-methoxyethyl)ether molar ratio of at least 1:0.5.

DETAILED DESCRIPTION OF THE INVENTION

A halogen-free reactant solution is comprised of dicyclopentadiene (hereinafter referred to as DCPD), trialkyl aluminum and bis(2-methoxyethyl)ether. In the preferred embodiment of the reactant solution, dicyclopentadiene is the only monomer present. In other embodiments, the reactant solution may additionally contain up to about 20% of one or more other metathesis polymerizable, cycloolefin comonomer, so long as the comonomer does not lower the flash point of the reactant solution below 100° F. Representative cycloolefin comonomers include norbornene, norbornadienen, dimethanehexahydronaphthalene, and dimethaneoctahydronaphthalene. The flash point of any particular combination of monomers is readily determinable without undue experimentation by employing the method of ASTM D32-78.

The reactant solution also contains trialkyl aluminum. Each alkyl is composed of from 5 to 10 carbon atoms and each alkyl can be straight chained or branched. The preferred trialkyl aluminum is tri-n-octyl aluminum. The trialkyl aluminum is present is a dicyclopentadiene to trialkyl aluminum molar ratio of about 80:1 to about 1300:1, preferably about 200:1 to about 500:1.

The third component of the reactant solution is bis(2-methoxyethyl)ether. The molar ratio of the trialkyl aluminum to bis(2-methoxyethyl)ether is at least about 1:0.5, preferably about 1:1 to about 1:4. For maximum effectiveness as a reactant solution in the method described in U.S. Pat. No. 4,400,340, the bis(2-methoxyethyl)ether is added to the monomer or combination of monomers before the trialkyl aluminum is added.

In some embodiments, a preformed elastomer is added to the reactant solution. The addition of the elastomer serves to increase the viscosity of the reactant solution and improve the impact resistance of a final thermoset polymeric product produced in accordance with the method disclosed in U.S. Pat. No. 4,400,340. The elastomer is dissolved in an amount of from about 3 to about 15 weight percent, based on the weight of the monomer or combination of monomers. Illustrative elastomers include natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, and ethylene-propylenediene terpolymers.

The best mode now contemplated of carrying out this invention is exemplified by the following working examples of preferred specific embodiments. The invention is not limited to these specific examples.

EXAMPLES 1-5

Examples 1-5 illustrate preferred embodiments of reactant solutions comprised of DCPD, tri-n-octyl aluminum (TNOCTAL) and bis(2-methoxyethyl)ether (diglyme).

Reactant solutions are made in the following manner: first, diglyme is added to dicyclopentadiene. Next, TNOCTAL is added to the diglyme-DCPD solution. The amount of each component is shown in Table 1.

The flash point of each sample was actually measured by the method of ASTM D-3278 using a Seta flash closed tester (manufactured by Paul N. Gardner Co., Lauderdale by the Sea, Fla.). The flash point of each sample is shown in Table 1.

TABLE 1

|  | Example 1 | Example 2 | Example 3 | Example 4 | Example 5 |
| --- | --- | --- | --- | --- | --- |
| DCPD | 368 mmol | 379 mmol | 366 mmol | 368 mmol | 364 mmol |
| TNOCTAL | 1.1 mmol | 1.1 mmol | 1.3 mmol | 1.9 mmol | 4.7 mmol |
| diglyme | 4.4 mmol | 21 mmol | 1.3 mmol | 1.9 mmol | 4.7 mmol |
| Flash Point | 102° F. | 105° F. | 104° F. | 105° F. | 105° F. |

What I claim and desire to protect by Letters Patent is:

1. A halogen-free polymerization reactant solution useful in metathesis-catalysis comprising dicyclopentadiene; trialkyl aluminum, where each alkyl contains from 5 to 10 carbon atoms and where the trialkyl aluminum is present in a dicyclopentadiene to trialkyl aluminum molar ratio of about 80:1 to about 1300:1; and bis(2-methoxyethyl)ether, where the bis(2-methoxyethyl)ether is present in a trialkyl aluminum to bis(2-methoxyethyl)ether ratio of at least 1:0.5, said reactant solution having a flash point greater than 100° F.

2. The halogen-free polymerization reactant solution of claim 1 wherein the molar ratio of dicyclopentadiene to trialkyl aluminum is about 200:1 to about 500:1.

3. The halogen-free polymerization reactant solution of claim 1 wherein the trialkyl aluminum is tri-n-octyl aluminum.

4. The halogen-free polymerization reactant solution of claim 2 wherein the trialkyl aluminum is tri-n-octyl aluminum.

5. The halogen-free polymerization reactant solution of claim 1 further comprising a preformed elastomer present in an amount of from about 3 to about 15 weight percent, based on the weight of the dicyclopentadiene.

6. The halogen-free polymerization reactant solution of claim 2 further comprising a preformed elastomer present in an amount of from about 3 to about 15 weight percent, based on the weight of the dicyclopentadiene.

7. The halogen-free polymerization reactant solution of claim 3 further comprising a preformed elastomer present in an amount of from about 3 to about 15 weight percent, based on the weight of the dicyclopentadiene.

8. The halogen-free polymerization reactant solution of claim 4 further comprising a preformed elastomer present in an amount of from about 3 to about 15 weight percent, based on the weight of the dicyclopentadiene.

9. The halogen-free polymerization reactant solution of claim 1 wherein the molar ratio of trialkyl aluminum to bis(2-methoxyethyl)ether is from about 1:1 to about 1:4.

10. The halogen-free polymerization reactant solution of claim 4 wherein the molar ratio of trialkyl aluminum to bis(2-methoxyethyl)ether is from about 1:1 to about 1:4.

11. A method for providing a halogen-free reactant solution having a flash point greater than 100° F., useful in metathesis-catalysis polymerization, comprising: providing a halogen-free reactant solution, said reactant solution comprising dicyclopentadiene; trialkyl aluminum, where each alkyl contains from 5 to 10 carbon atoms and where the trialkyl aluminum is present in a dicyclopentadiene to trialkyl aluminum molar ratio of about 80:1 to about 1300:1; and bis(2-methoxyethyl)ether, where the bis(2-methoxyethyl)ether is present in a trialkyl aluminum to bis(2-methoxyethyl)ether ratio of at least 1:0.5, said reactant solution having a flash point greater than 100° F.

12. The method of claim 11 wherein the molar ratio of dicyclopentadiene to trialkyl aluminum is about 200:1 to about 500:1.

13. The method of claim 11 wherein the trialkyl aluminum is tri-n-octyl aluminum.

14. The method of claim 12 wherein the trialkyl aluminum is tri-n-octyl aluminum.

15. The method of claim 11 further comprising a preformed elastomer present in an amount of from about 3 to about 15 weight percent, based on the weight of the dicyclopentadiene.

16. The method of claim 12 further comprising a preformed elastomer present in an amount of from about 3 to about 15 weight percent, based on the weight of the dicyclopentadiene.

17. The method of claim 13 further comprising a preformed elastomer present in an amount of from about 3 to about 15 weight percent, based on the weight of the dicyclopentadiene.

18. The method of claim 14 further comprising a preformed elastomer present in an amount of from about 3 to about 15 weight percent, based on the weight of the dicyclopentadiene.

19. The method of claim 11 wherein the molar ratio of trialkyl aluminum to bis(2-methoxyethyl)ether is from about 1:1 to about 1:4.

20. The method of claim 14 wherein the molar ratio of trialkyl aluminum to bis(2-methoxyethyl)ether is from about 1:1 to about 1:4.

21. A method of claim 11 further comprising up to about 20% of one or more other metathesis polymerizable, cycloolefin monomer.

22. The halogen-free polymerization solution of claim 1 further comprising up to about 20% of one or more other metathesis polymerizable, cycloolefin monomer.

* * * * *